(12) United States Patent
Roehl

(10) Patent No.: US 7,032,960 B2
(45) Date of Patent: Apr. 25, 2006

(54) CORNER REGION BETWEEN THE LATERAL AND REAR ROOF FRAMES ON A MOTOR VEHICLE WITH A HATCH BACK DOOR AND METHOD FOR PRODUCTION THEREOF

(75) Inventor: Wolfgang Roehl, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/469,388

(22) PCT Filed: Feb. 7, 2002

(86) PCT No.: PCT/EP02/01265

§ 371 (c)(1),
(2), (4) Date: Feb. 18, 2004

(87) PCT Pub. No.: WO02/070326

PCT Pub. Date: Sep. 12, 2002

(65) Prior Publication Data

US 2004/0124671 A1    Jul. 1, 2004

(30) Foreign Application Priority Data

Mar. 2, 2001  (DE) ................. 101 10 056

(51) Int. Cl.
*B62D 25/24* (2006.01)
*B62D 25/08* (2006.01)
(52) U.S. Cl. .............................. 296/203.04
(58) Field of Classification Search ........... 296/203.04, 296/201, 202, 203.01, 56, 146.8, 187.01, 296/187.11, 191, 193.02, 193.05, 193.06, 296/193.08, 185.1, 186.3
See application file for complete search history.

(56) References Cited

U.S. PATENT DOCUMENTS

| | | | | | |
|---|---|---|---|---|---|
| 4,634,173 A | * | 1/1987 | Aonuma et al. | ........ | 296/203.04 |
| 4,775,181 A | * | 10/1988 | Shoda | .................... | 296/203.04 |
| 5,226,696 A | * | 7/1993 | Klages et al. | .......... | 296/203.01 |
| 5,855,407 A | * | 1/1999 | Fukuda | .................. | 296/203.03 |
| 6,126,232 A | * | 10/2000 | Nakano | ...................... | 296/210 |

(Continued)

FOREIGN PATENT DOCUMENTS

DE       19506160 A1    8/1996

(Continued)

*Primary Examiner*—H. Gutman
(74) *Attorney, Agent, or Firm*—Crowell & Moring LLP

(57) ABSTRACT

The invention relates to a corner region between the lateral and rear roof frame of a motor vehicle having a rear door, and to a method for producing it. In order to improve the absorption of mechanical forces acting on the body shell in the roof region in a simple manner, it is proposed to form the corner region from shell-shaped components of the rear roof frame and a D-pillar of the motor vehicle and from a hollow profile formed by internal high pressure, the components and the hollow profile being connected nonreleasably to one another. The hollow profile is designed as a junction component which, with a first, open end, is connected to the D-pillar, with a closed neck aligned with the first, open end, is connected to the shell components of the lateral roof frame and, with a second, open end which is angled away from the longitudinal section of the hollow profile, which extends from the first, open end beyond the neck, is connected to the components of the rear roof frame.

28 Claims, 2 Drawing Sheets

U.S. PATENT DOCUMENTS

| | | |
|---|---|---|
| 6,254,174 B1 * | 7/2001 | Wee .................... 296/203.04 |
| 6,382,706 B1 * | 5/2002 | Yuge et al. ............. 296/146.4 |
| 6,578,909 B1 * | 6/2003 | Reed et al. ................ 296/210 |
| 6,595,580 B1 * | 7/2003 | Eberle et al. .......... 296/203.04 |
| 6,789,837 B1 * | 9/2004 | Mitsui et al. ........... 296/146.8 |
| 2004/0124672 A1 * | 7/2004 | Eipper et al. .............. 296/210 |

FOREIGN PATENT DOCUMENTS

| | | |
|---|---|---|
| DE | 19653509 A1 | 6/1998 |
| JP | 10-316021 | 12/1998 |
| JP | 11-321706 | 11/1999 |
| KR | 1998-041134 | 8/1998 |

* cited by examiner

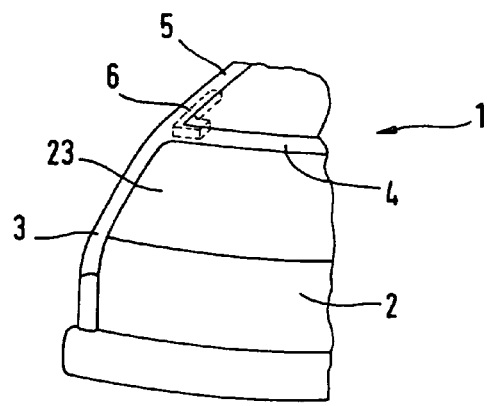
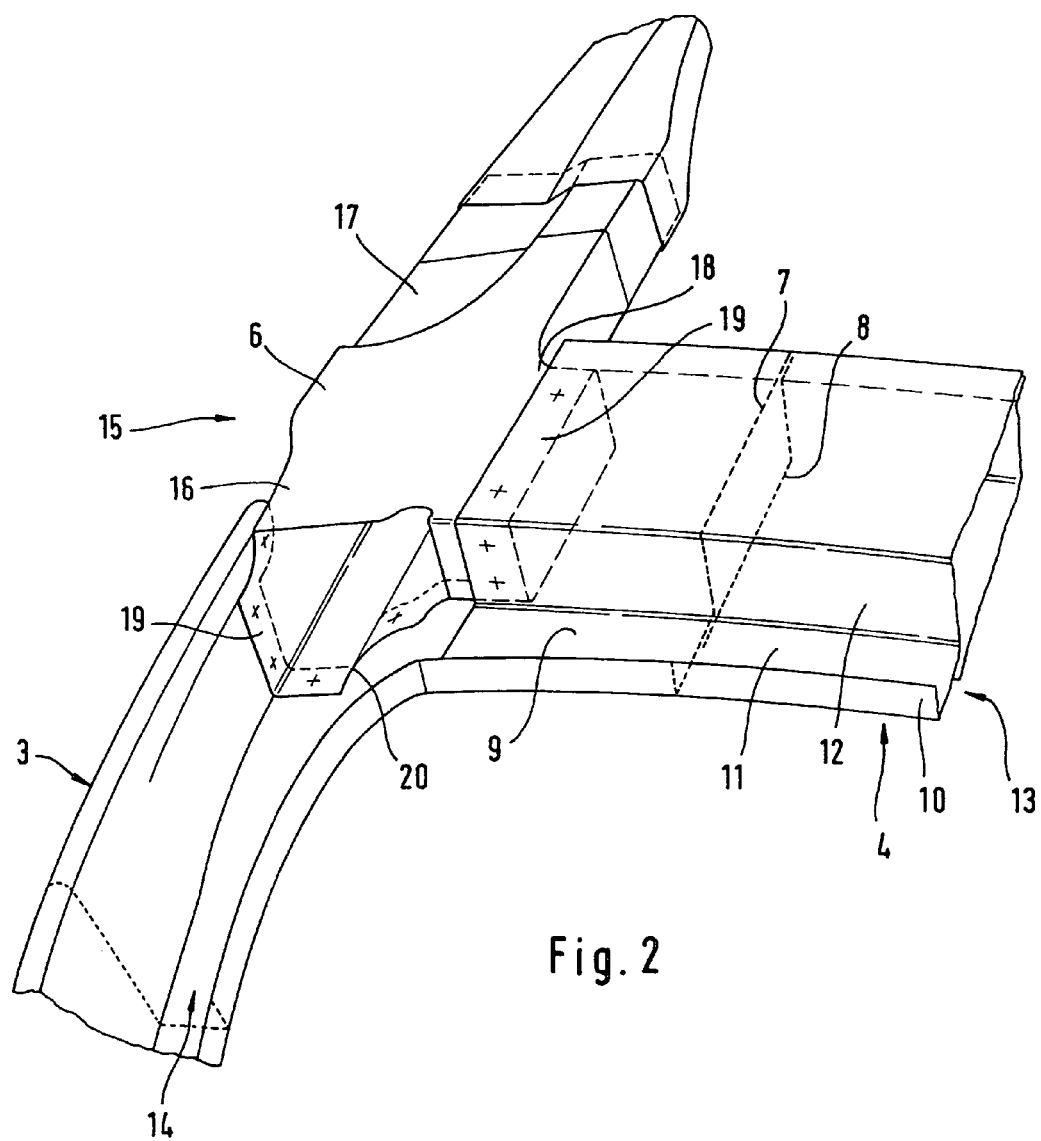

CORNER REGION BETWEEN THE LATERAL AND REAR ROOF FRAMES ON A MOTOR VEHICLE WITH A HATCH BACK DOOR AND METHOD FOR PRODUCTION THEREOF

BACKGROUND AND SUMMARY OF THE INVENTION

This invention relates to a corner region between the lateral and rear roof frame of a motor vehicle having a rear door, and to a method for producing it.

In conventional motor vehicles having a rear door, a large number of plates are used in the body shell in order to confer the required stiffness and strength of the corner region between the lateral and the rear roof frame, since the corner region, which comprises sheet-metal shells of the lateral roof frame, is open toward the rear of the vehicle in order to hold a hinge for the rear door and is therefore weakened. In this case, work has to be carried out in a very complex manner with seam-sealing material in order to prevent water which penetrates into the hinge opening from being able to pass into the interior of the vehicle and the rest of the body shell.

The invention is based on the object of developing a corner region between the lateral and rear roof frame of a motor vehicle having a rear door and a method for producing it to the effect that the absorption of mechanical forces acting on the body shell in the roof region is improved in a simple manner.

This object is achieved according to the invention by the features of claim 1 in respect of the corner region and by the features of claim 10 in respect of the production method.

Owing to the fact that a junction component consisting of a hollow profile is used for the corner region, high stiffness and strength is provided for this region. This is all the more so if the hollow profile is a single-piece component which is formed from a tubular blank. Single-piece formation means that the body shell is very greatly simplified structurally and in terms of manufacturing at this point and the multiplicity of parts is drastically reduced, and at the same time forces which act from the outside, in particular in a crash, can be considerably better absorbed by the lateral and rear roof frame and the D-pillar and can be transferred without stress concentrations. It is true that because the hollow profile is closed seamlessly in the direction of the front end of the vehicle, water can enter into the hollow profile through the rearwardly pointing opening. However, further penetration through the body shell and penetration into the interior of the vehicle is not possible, and so the only route for the water to leave is the inlet opening. This considerably reduces the outlay on sealing, which is now focused entirely on the inlet opening. The technique of forming by internal high pressure means that the hollow profile can be matched exactly to the desired space-dependent shape and cross section in a relatively simple manner in terms of the process.

Expedient refinements of the invention can be gathered from the subclaims; otherwise, the invention is explained in greater detail below with reference to an exemplary embodiment which is illustrated in the drawings.

BRIEF DESCRIPTION OF THE DRAWINGS

FIG. 1 shows, schematically in a perspective illustration, a motor vehicle having a corner region according to the invention of the lateral and rear roof frame, FIG. 2 shows, in a sectional illustration, part of the corner region according to the invention from FIG. 1 with the lateral and rear roof frame and a D-pillar.

DETAILED DESCRIPTION OF THE INVENTION

Figure 3:
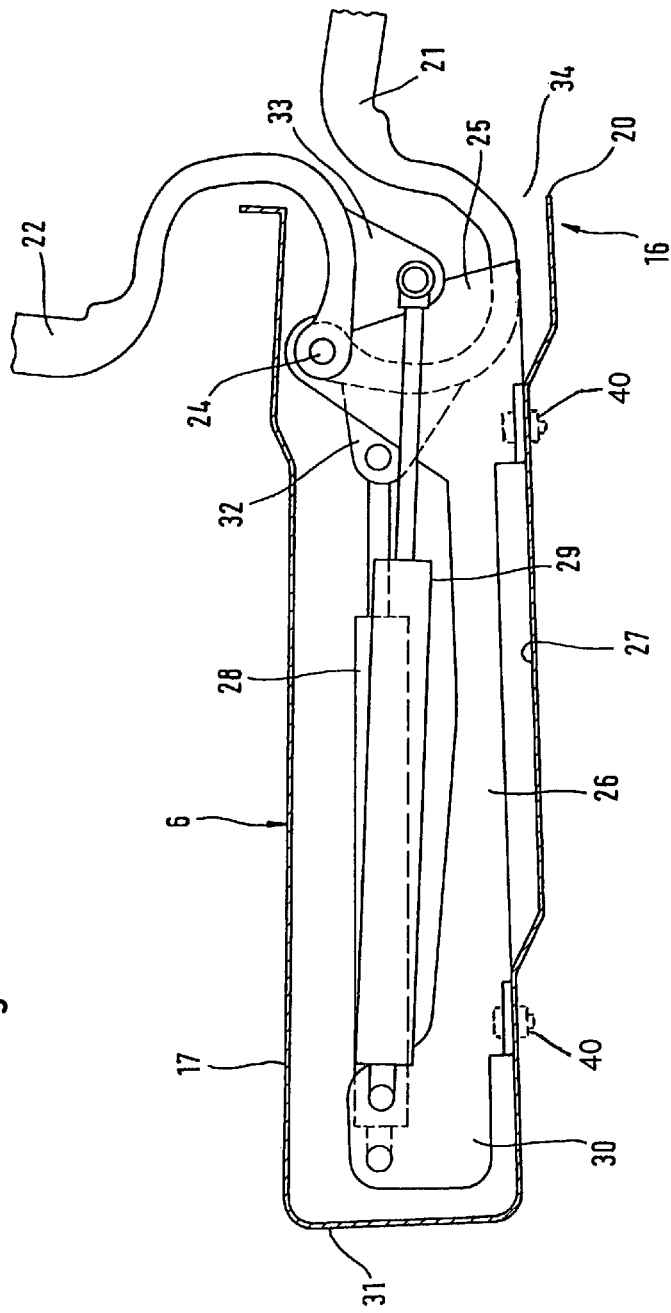
FIG. 3 shows, in a lateral longitudinal section, the corner region from FIG. 1 with a hinge system arranged on the inside.

FIG. 1 illustrates the rear side of a motor vehicle 1, the rear door 2 of which is fitted into the frame bounded by two D-pillars 3 (only the left-hand one is shown here), and the rear roof frame 4. A lateral roof frame 5 is connected to the D-pillar 3 and to the rear roof frame 4 in the roof region toward the front end of the vehicle. The D-pillar 3 and the rear roof frame 4 and the lateral roof frame 5 are connected to one another by a junction component 6 which occupies the connecting region in a three-dimensional manner.

According to FIG. 2, the rear roof frame 4 comprises two shell-shaped components, i.e. an upper half shell 7 and a lower half shell 8 having a step-shaped profile, which are connected nonreleasably, preferably welded or bonded, to each other to form a box-shaped hollow profile. The upper half shell 7 has a flange 9 which protrudes toward the rear of the vehicle, is formed by the lower step of said half shell and the edge 10 of which is repositioned upward. The bottom section 11 of the flange 9 forms, in a functionally favorable and component-saving manner together with the repositioned edge 10 and the front wall 12, which is likewise formed by the upper half shell and connects the two steps to each other, a channel-like holder 13 for a frame seal. The D-pillar 3, the holder 14 of which merges into the holder 13 of the rear roof frame 4, is formed in a corresponding manner.

On the end side together with the junction component 6, the half shells 7 and 8 and the D-pillar 3 form the corner region 15 between the lateral roof frame 5 and rear roof frame 4. The junction component 6 is designed as an elongate hollow profile of rectangular cross section which, with a first, open end 16, is connected to the D-pillar 3 and, with a closed neck 17 aligned with the first, open end 16, is connected toward the front end of the vehicle to the shell components of the lateral roof frame 5. Furthermore, the junction component 6 has a second end 18 which is angled away from its longitudinal section, which extends from the first, open end 16 beyond the neck 17, said second end, like the first end 16 which is situated close to it, being open and being connected to the half shells 7 and 8 of the rear roof frame 4. Said half shells, by means of their hollow-profile section, circumferentially cover the second, open end 18 while the shell components of the D-pillar 3 circumferentially cover the first, open end 16, and the shell components of the lateral roof frame 5 circumferentially cover the neck 17 of the junction component 6, with the formation of an overlapping zone 19. In the latter, the components are connected, preferably spot-welded, to the junction component 6. For the exact transition of the holder 13 of the rear roof frame 4 into the holder 14 of the D-pillar 3, the first, open end 16 of the junction component has a notch 20 which can be produced by a three-dimensional laser cut. Owing to the junction component 6 being attached to the lateral and the rear roof frame and to the D-pillar 3 in a corresponding manner in terms of shape, a mechanical force acting from the outside can be particularly readily distributed in the body shell structure, so that impact energy is very readily absorbed.

A further exceptional advantage of the corner region 15 according to the invention is the use of the junction component 6 as a stiff receiving housing for a hinge system. In this case, the spring-damped hinge system, which is arranged within the junction component 6, comprises a hinge 21 for the rear door 2 and a hinge 22 for a tiltable rear window 23 (FIG. 3). The two hinges 21 and 22 are mounted on the same horizontal rotating spindle 24 which is held at one end 25 of a bearing block 26 which is fastened releasably, in particular screwed, to the bottom 27 of the junction component 6. With regard to the arrangement and design of the screw holes, the screw connection can take place in such a manner that the bearing block 26 on the bottom 27 of the junction component 6 can be varied in the longitudinal and transverse directions of the vehicle 1, as a result of which the position of the hinge system can be adjusted, in the closed state of the rear door 2, in a rapid manner which is not at all complicated in terms of the installation. This enables the size of the gap of the closing joint between the rear door 2 and the frame surrounding the latter on the vehicle to be exactly defined in a simple manner with individual adaptation to the manufacturing tolerances, which is of benefit to opening and closing the rear door 2 without obstruction for as long as possible. Not only is the simple adjustability an advantage arising from the invention, but so too is the installation of the hinge system in the hollow profile of the junction component 6 which is not difficult on account of the easy, manual accessibility, the system, in the form of a module which is preassembled on the bearing block, having merely to be inserted into the hollow profile and screwed on. This is also favorable in the event of repair, in which case a particular affected hinge 21, 22 and/or the rear door 2 can be interchanged there rapidly and simply. Furthermore, the two hinges 21 and 22 of the hinge system are supported on different hydraulic or pneumatic spring-damping elements, in "gas-filled springs" 28 and 29. These are mounted pivotably at one end at the end 30 of the bearing block 26, which is situated close to the closed end 31 of the neck 17, and are fastened in an articulated manner at the other end to a protruding sheet-metal tab 32, 33 of the respectively assigned hinge 21, 22, respectively. Simple installation of the gas-filled springs 28 and 29 on the bearing block 26 in a manner which saves on manufacturing time is also produced by the invention, since, after the body shell is passed through the painting operation without the gas-filled springs 28, 29, which would otherwise become damaged in the painting heat and become functionally impaired, said gas-filled springs have to be fitted subsequently, which can be easily made possible by loosening the screws and pulling out the bearing block 26. This causes paint scratches at the screw-connection locations, but because they are situated deep within the junction component 6 they are advantageously optically invisible. The gas-filled springs 28, 29 may also be pushed into the junction component 6 and, via a lateral opening in the junction component 6, which opening is subsequently closed in a watertight manner by means of a rubber stopper, pressed onto the spherical-headed mounting.

Advantages furthermore arise in the routing of electric supply and control cables from the rear roof frame 4 into the junction component 6, and—from the latter—via the hinges 21 and 22 into the rear door 2, said cable routing also being facilitated in respect of the outlay for watertightness.

To produce the junction component 6 of the corner region 15, use is made of a rectilinear tube which is subsequently bent in a knee-shaped manner and then pinched into a profile preform, so that the angled tube obtains a rectangular cross section. The cross-sectional shape can also be different and can be adapted to the particular space conditions and/or the particular requirements as desired. The profile preform is then placed into an internal high-pressure forming mold and is expanded in accordance with the desired final shape by means of fluidic internal high pressure. At the same time, the neck 17 is blown out at the location of the knee-shaped bend, said neck running essentially coaxially with the opening 34 in the hollow profile that points toward the rear of the vehicle in the installed position, and subsequently remaining closed. In this case, it is conceivable to allow the forming process of the neck 17 to take place in a number of steps, in which case the hollow profile is subjected to intermediate annealing after each step in order to reliably make possible the large amount of strain which exists at the given, large drawn-out length of the neck 17.

To produce the corner region 15, the shell-shaped components 7, 8 of the rear roof frame and of the D-pillar 3 of the motor vehicle 1 are joined onto the finished junction component 6. This can take place, firstly, by first of all the shell components 7 and 8 being welded to one another or bonded to one another forming a box-shaped hollow profile, after which the latter is then placed, in a simple manner in terms of the process, onto the open, second end 18 of the junction component 6. In this preliminary fixed connection, a weld, preferably spot welds or a penetration weld by means of a high-energy beam, to the junction component 6 can then take place in the overlapping zone 19 of the plug-in connection. The hall-shell of the D-pillar 3 is placed onto the notch 20 and is welded to the first, open end 16 of the junction component 6. Secondly, it is also conceivable to place the shell components onto the circumference of the ends 16 and 18, thus producing the overlapping zone 19 in which the joining then takes place by means of welding. In this case, the connection of the shell components to one another to form a hollow profile can also take place, in a manner which is economical for the process, in a welding operation. Finally, the spring-damped hinge system is pushed into the opening 34 in the junction component 6, which opening points toward the rear of the vehicle, and is fastened releasably, in particular screwed, for example by screws 40, to the bottom 27 of said junction component.

The invention claimed is:

1. A corner region between the lateral and rear roof frames of a motor vehicle having a rear door, the corner region comprising:
   shell-shaped components of the rear roof frame,
   a D-pillar of the motor vehicle, and
   a hollow profile formed by internal high pressure,
   wherein the components, the D-pillar, and the hollow profile are connected non-releasably to one another, and
   wherein the hollow profile is designed as a junction component which, with a first, open end, is connected to the D-pillar, with a closed neck aligned with the first, open end, is connected to shell components of the lateral roof frame and, with a second, open end which is angled away from the longitudinal section of the hollow profile, which extends from the first, open end beyond the neck, is connected to the components of the rear roof frame.

2. The corner region as claimed in claim 1, wherein one of the shell-shaped components of the rear roof frame has a flange which protrudes toward the rear of the vehicle and which has an edge which is repositioned upward, and which, together with the repositioned edge, forms a channel-like holder for a seal.

3. The corner region as claimed in claim 1, wherein the shell-shaped components of the rear roof frame are connected to each other to form a box-shaped hollow profile.

4. The corner region as claimed in claim 1, wherein the shell-shaped components of the rear roof frame circumferentially cover the second, open end, wherein the D-pillar circumferentially covers the first, open end, and wherein the lateral roof frame circumferentially covers the neck of the junction component, with formation of overlapping zones in which the shell-shaped components of the rear roof frame are connected to the junction component.

5. The corner region as claimed in claim 1, wherein a spring-damped hinge system comprising a hinge for the rear door and a hinge for a tiltable rear window is arranged within the junction component.

6. The corner region as claimed in claim 5, wherein the hinge system is fastened releasably to the bottom of the junction component.

7. The corner region as claimed in claim 5, wherein the hinge system is held on a bearing block which is fastened to the bottom of the junction component.

8. The corner region as claimed in claim 7, wherein a position of the hinge system on the bearing block can be varied in the longitudinal and transverse directions of the vehicle.

9. The corner region as claimed in claim 5, wherein the hinges of the hinge system are supported on different hydraulic or pneumatic spring-damping elements.

10. The corner region as claimed in claim 6, wherein the hinge system is screwed to the bottom of the junction component.

11. The corner region as claimed in claim 2, wherein the shell-shaped components of the rear roof frame are connected to each other to form a box-shaped hollow profile.

12. The corner region as claimed in claim 2, wherein the shell-shaped components of the rear roof frame circumferentially cover the second, open end, wherein the D-pillar circumferentially covers the first, open end, and wherein the lateral roof frame circumferentially covers the neck of the junction component, with formation of overlapping zones in which the shell-shaped components of the rear roof frame are connected to the junction component.

13. The corner region as claimed in claim 3, wherein the shell-shaped components of the rear roof frame circumferentially cover the second, open end, wherein the D-pillar circumferentially covers the first, open end, and wherein the lateral roof frame circumferentially covers the neck of the junction component, with formation of overlapping zones in which the shell-shaped components of the rear roof frame are connected to the junction component.

14. The corner region as claimed in claim 2, wherein a spring-damped hinge system comprising a hinge for the rear door and a hinge for a tiltable rear window is arranged within the junction component.

15. The corner region as claimed in claim 14, wherein the hinge system is fastened releasably to the bottom of the junction component.

16. The corner region as claimed in claim 14, wherein the hinge system is held on a bearing block which is fastened to the bottom of the junction component.

17. The corner region as claimed in claim 16, wherein a position of the hinge system on the bearing block can be varied in the longitudinal and transverse directions of the vehicle.

18. The corner region as claimed in claim 14, wherein the hinges of the hinge system are supported on different hydraulic or pneumatic spring-damping elements.

19. The corner region as claimed in claim 3, wherein a spring-damped hinge system comprising a hinge for the rear door and a hinge for a tiltable rear window is arranged within the junction component.

20. The corner region as claimed in claim 19, wherein the hinge system is fastened releasably to the bottom of the junction component.

21. The corner region as claimed in claim 19, wherein the hinge system is held on a bearing block which is fastened to the bottom of the junction component.

22. The corner region as claimed in claim 21, wherein a position of the hinge system on the bearing block can be varied in the longitudinal and transverse directions of the vehicle.

23. The corner region as claimed in claim 19, wherein the hinges of the hinge system are supported on different hydraulic or pneumatic spring-damping elements.

24. The corner region as claimed in claim 4, wherein a spring-damped hinge system comprising a hinge for the rear door and a hinge for a tiltable rear window is arranged within the junction component.

25. The corner region as claimed in claim 24, wherein the hinge system is fastened releasably to the bottom of the junction component.

26. The corner region as claimed in claim 24, wherein the hinge system is held on a bearing block which is fastened to the bottom of the junction component.

27. The corner region as claimed in claim 26, wherein a position of the hinge system on the bearing block can be varied in the longitudinal and transverse directions of the vehicle.

28. The corner region as claimed in claim 24, wherein the hinges of the hinge system are supported on different hydraulic or pneumatic spring-damping elements.

* * * * *